Aug. 14, 1923.

C. BORNMANN

FILM SPOOL CARRIAGE

Filed Dec. 15, 1922

1,464,558

INVENTOR
CARL BORNMANN
BY
Philip S. Hopkins
ATTORNEY

Patented Aug. 14, 1923.

1,464,558

UNITED STATES PATENT OFFICE.

CARL BORNMANN, OF BINGHAMTON, NEW YORK, ASSIGNOR TO ANSCO COMPANY, OF BINGHAMTON, NEW YORK.

FILM-SPOOL CARRIAGE.

Application filed December 15, 1922. Serial No. 607,194.

*To all whom it may concern:*

Be it known that I, CARL BORNMANN, a citizen of the United States, and a resident in the city of Binghamton, county of Broome, and State of New York, have invented a new and useful Improvement in a Film-Spool Carriage, of which the following is a description, reference being had to the accompanying drawings, which form a part of this application.

This invention relates particularly to a spool carriage for that type of camera generally known as the vest pocket camera. As is well known this type of camera is very small in size and consequently it has been difficult to provide the same with a substantial form of spool carriage, which will furnish the small film spools with solid and rigid journals. Heretofore more or less flimsy journal bearings have been provided for this purpose with the result that when any considerable degree of strain is placed upon the journals, due to the winding of the film from one spool to another, the parts comprising the spool carriage are distorted and the spool binds in its bearings, which makes impossible the accurate winding of the film.

It is the primary object of my invention therefore, to overcome this difficulty by providing a novel form of spool carriage, which furnishes the film spool with rigid journals, resulting in accurate and positive winding of the film.

It is also an object of this invention to so construct the spool carriage that it permits of easy insertion and removal of the film spool.

It is a further object of this invention to provide the spool carriage with means whereby the journals for the film spool are always held in positive alinement and at all times in position to receive the trunnions of the film spool.

It is a still further object to construct the spool carriages of such size as to easily fit within the spool chambers of the smallest camera without sacrificing any of the accuracy and rigidness required of such a device.

Other objects and advantages in details of construction will be apparent as the description proceeds, reference being had to the accompanying drawings wherein like reference numerals indicate like parts.

Figure 1:
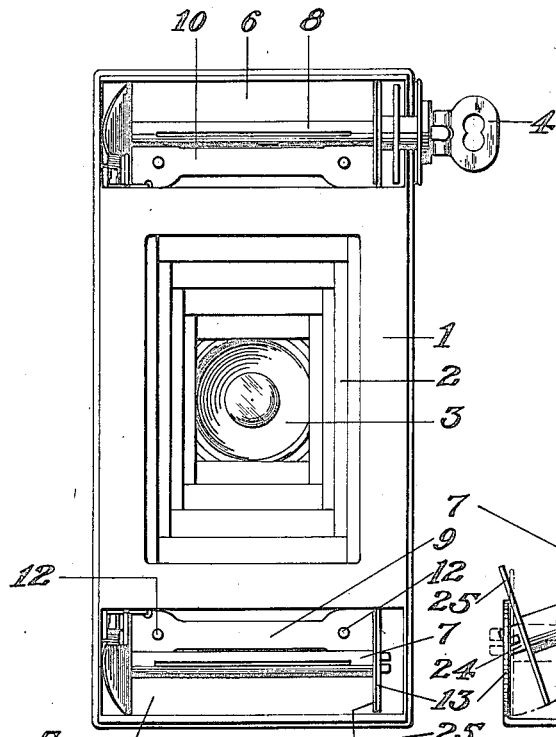
Figure 1 is a rear view of a small camera of the vest pocket type with the back removed showing clearly the position of my improved spool carriages therein.

A small camera of the character indicated is designated by the reference numeral 1, and is provided, as shown in Figure 1, with the usual bellows 2, lens 3 and winding key 4. These parts are of the ordinary construction and require no detailed description here.

5 and 6 denote the spool chambers of the camera in which the film spools 7 and 8 are removably mounted.

Secured within each of the spool chambers 5 and 6 are my improved spool carriages designated at 9 and 10. As these carriages are practically identical in structure the detailed description of more than one of the same will be unnecessary.

Figure 2:
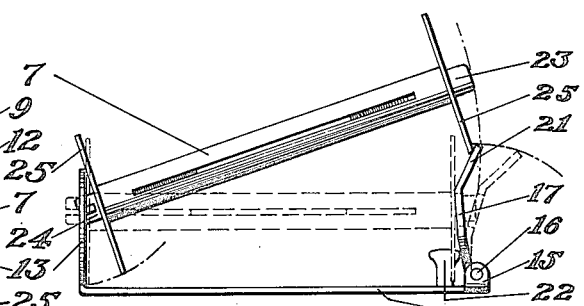
Figure 2 is a side view showing in detail the operation of the carriage in cooperation with a film spool.
Figure 3:
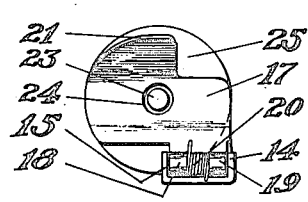
Figure 3 is an end view of the carriage showing the pivoted journal thereof.

The spool carriage comprises a narrow base plate 11 extending across and secured within the bottom of the spool chamber in any suitable manner, as by the rivets 12. One end of the base plate 11 is bent up at right angles, as shown in Figure 2, forming an integral and rigid journal plate 13. This journal plate 13 is provided centrally thereof with an aperture for the reception of one of the trunnions of the film spool 7. The opposite end of the base plate 11 is provided with two upstanding ears 14 and 15, and extending thru these ears is a pivot pin 16. A journal plate 17 is provided at its lower end with two small coils 18 and 19 formed from the journal plate 17, and embracing the pin 16, thereby pivoting said journal plate on said pin. A coil spring 20 encircles the pin 16 between the rings 18 and 19 and has one end thereof bearing against the journal plate 17, and normally forcing the same inwardly. The pivoted journal 17 also is provided at its upper end with a finger piece 21, bent from said plate and extending slightly outwardly therefrom. This finger piece 21 provides for easy and ready manipulation of the pivoted plate 17.

Figure 4:
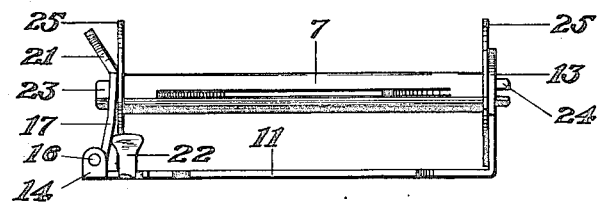
Figure 4 is a side view taken from an opposite side of the carriage of that shown in Figure 2, and showing the film spool in position.

Extending upwardly from the base plate 11 and integral therewith, at a point adjacent to the pivoted journal 17 is a stop lug 22. The purpose of this lug, as will be apparent from Figures 2 and 4, is to limit the movement of the journal 17 and to hold the same in position to engage the trunnion 23 of the film spool. Centrally of the journal plate 17 and in alinement with the opening (not shown) in the journal plate 13 is an opening 24, which provides the bearing for the trunnion 23.

The operation of the device described is as follows: The operator grasps the film spool intermediate its ends, inserts the trunnion 24 thereof into the bearing provided in the stationary journal plate 13, then by pressing downwardly upon the opposite end, one of the guide flanges 25 of said spool will engage with the upper end of the pivoted journal plate 17, forcing the same outwardly as shown in dotted lines in Figure 2 and permitting the trunion 23 to snap into the opening 24 of said journal plate, whereupon said plate will again be forced inwardly against the stop 22 by the action of the spring 20. When it is desired to remove the spool the operator grasps the finger piece 21 and pulls the same outwardly against the tension of the spring 20, thus disengaging the trunnion 23 from its bearing 24 and permitting the spool 7 to be withdrawn from the carriage.

It will thus be seen that I have devised a novel and practical form of spool carriage designed particularly for use in a small camera and which provides a solid and rigid journal for the film spool and at the same time includes means for the easy insertion and removal of such spool.

Of course the exact form shown and described above has to be taken as illustrative only for obviously the device is susceptible to various changes in details of construction and operation without departing from the scope of the invention. I do not therefore limit myself to the form shown other than by the appended claims.

I claim—

1. In combination with a camera, spool chambers therein, spool carriages rigidly secured in said chambers having pivoted spring tensioned means for removably and rotatably supporting film spools therein.

2. In combination with a camera, a spool chamber therein, a spool carriage rigidly secured in said chamber and having journals for a film spool, one of said journals being resiliently pivoted to provide means for the ready removal and insertion of the film spool.

3. In combination with a camera, a spool chamber therein, a spool carriage secured in said chamber and having journals for a film spool, one of said journals being resiliently pivoted, and a finger piece on said journal whereby said journal may be rocked to permit easy insertion and removal of the film spool.

4. In combination with a camera, a spool chamber therein, a spool carriage secured in said chamber and having journals for a film spool, one of said journals being resiliently pivoted, a finger piece on said journal and a stop for limiting the movement of said journal in one direction.

5. In combination with a camera, a spool chamber therein, a spool carriage rigidly secured in said chamber and having journals for a film spool, one of said journals being pivoted, a spring for normally rocking said journal on its pivot toward the film spool, and a stop for holding said journal in a position to trunnion the film spool.

6. In combination with a camera, a spool chamber therein, a spool carriage secured in said chamber and having journals for a film spool, one of said journals being pivoted, a spring for normally rocking said journal on its pivot toward the film spool and a stop carried by said carriage for limiting such movement of said journal.

7. In combination with a camera, a spool chamber therein, a spool carriage secured in said chamber and having journals for a film spool, one of said journals being pivoted, a spring for normally rocking said journal toward the film spool, a stop integral with said spool carriage for holding said journal in a position to engage with the trunnion of the film spool, and a finger piece on said journal whereby the same may be rocked on its pivot, thus providing for the easy insertion and removal of the film spool.

8. A spool carriage for cameras comprising a base plate, upstanding spool journals at the ends thereof, one of said journals being resiliently pivoted on said base plate whereby to permit easy insertion and removal of a film spool.

9. A spool carriage for cameras comprising a base plate, upstanding spool journals at the ends thereof, one of said journals being resiliently pivoted on said base plate, said journal being provided with a finger piece for easy manipulation thereof.

10. A spool carriage for cameras comprising a base plate, upstanding spool journals at the ends thereof, one of said journals being resiliently pivoted on said base plate, a stop on said base plate for limiting the movement of said journal in the direction of the film spool, and a finger piece on said journal, whereby to manipulate the same, providing for easy insertion and removal of the film spool.

CARL BORNMANN.